Figure 1A:
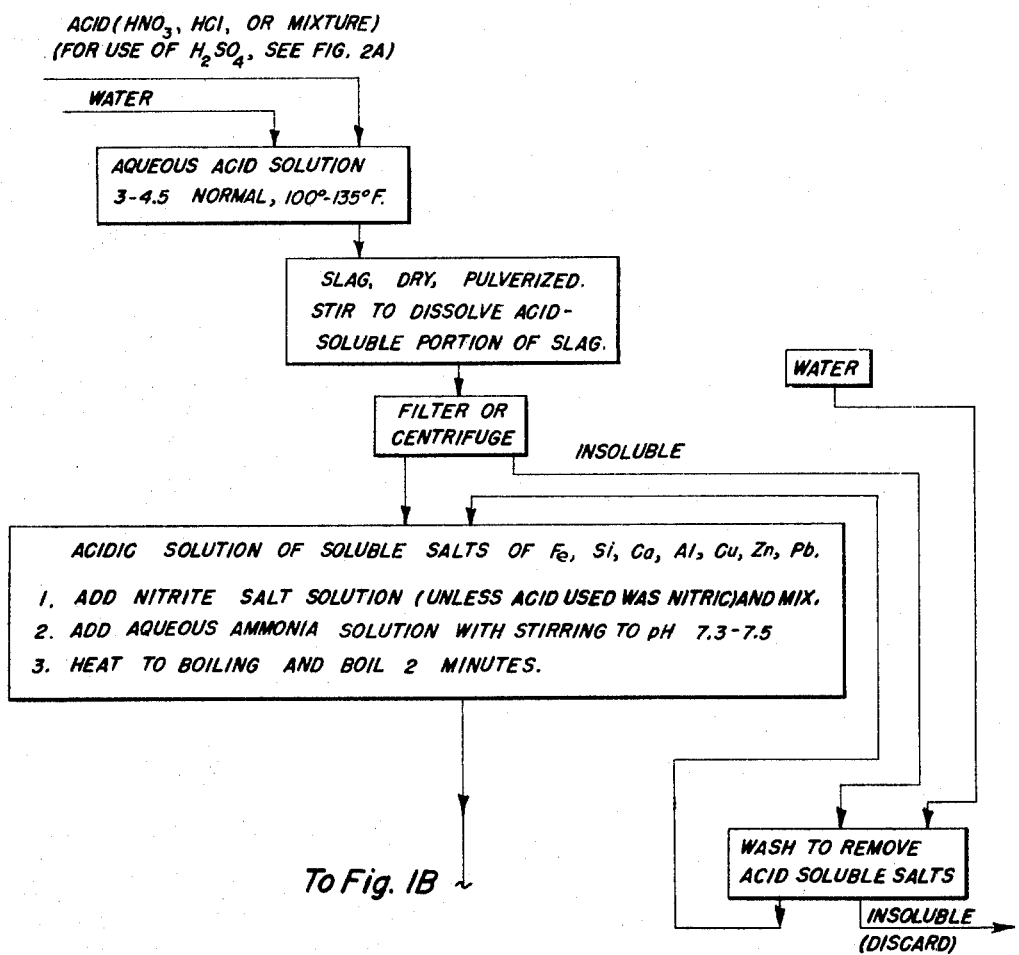
Figure 2B:
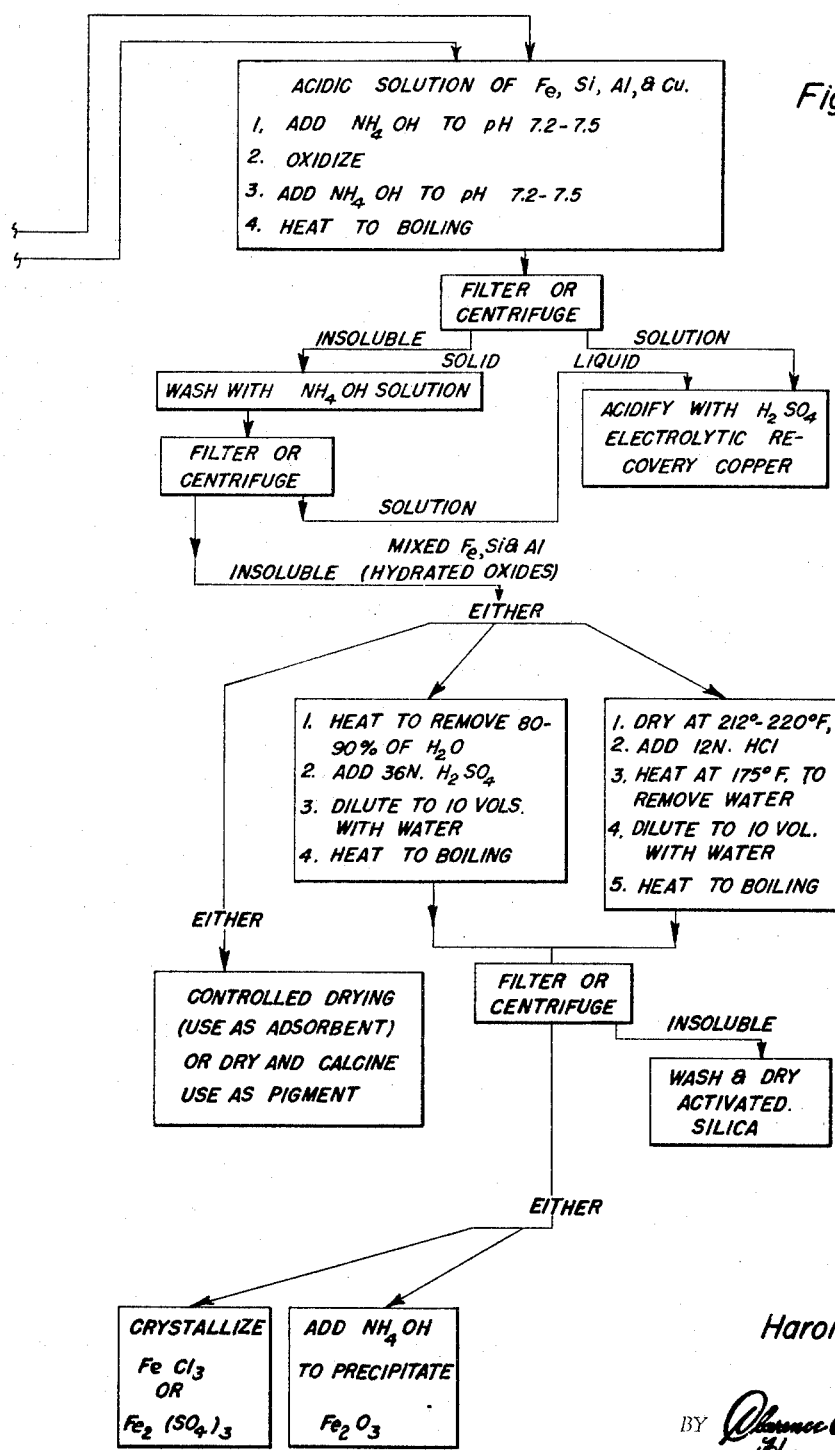

Sept. 20, 1966  H. W. WILSON  3,273,997
WET PROCESS FOR THE SEPARATION, ISOLATION, AND RECOVERY OF
CERTAIN METALLIC AND NON-METALLIC CONSTITUENTS OF WASTE
SLAG FROM REVERBERATORY REFINING
OF COPPER PYRITIC TYPE ORES
Original Filed Dec. 26, 1963  4 Sheets-Sheet 1

Harold W. Wilson
INVENTOR.

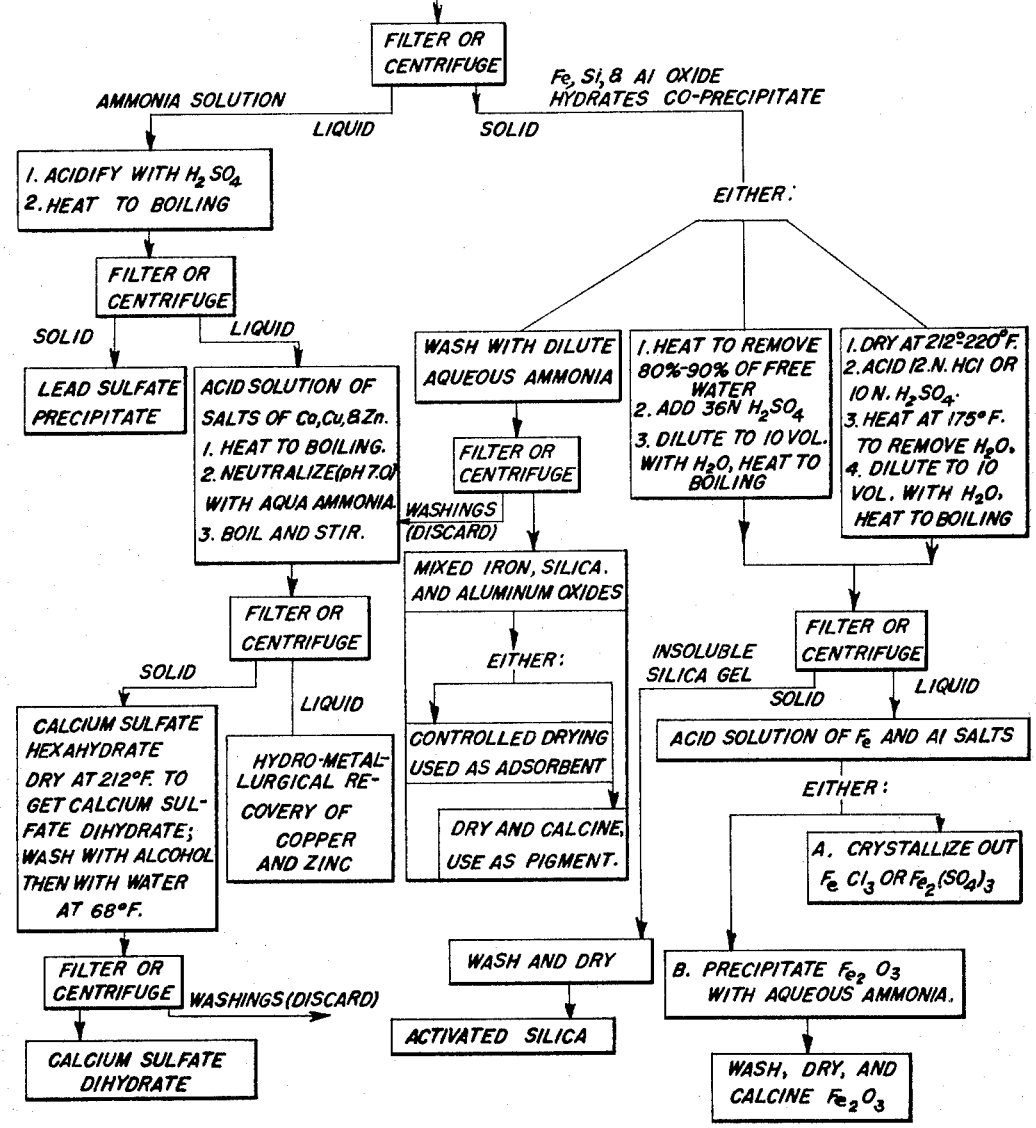

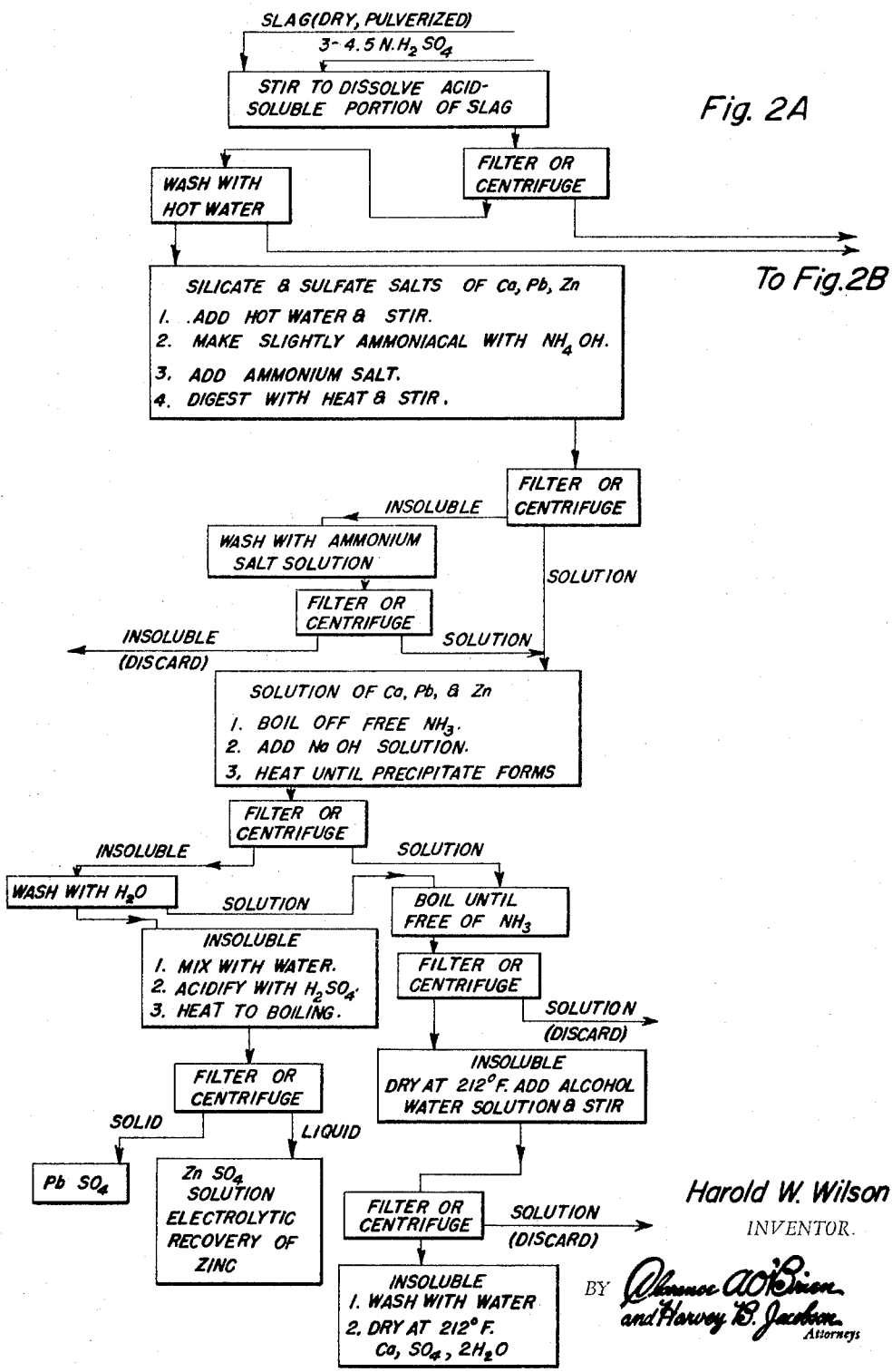

Sept. 20, 1966  H. W. WILSON  3,273,997
WET PROCESS FOR THE SEPARATION, ISOLATION, AND RECOVERY OF
CERTAIN METALLIC AND NON-METALLIC CONSTITUENTS OF WASTE
SLAG FROM REVERBERATORY REFINING
OF COPPER PYRITIC TYPE ORES
Original Filed Dec. 26, 1963  4 Sheets-Sheet 4

Harold W. Wilson
INVENTOR.

United States Patent Office 3,273,997
Patented Sept. 20, 1966

3,273,997
WET PROCESS FOR THE SEPARATION, ISOLATION, AND RECOVERY OF CERTAIN METALLIC AND NON-METALLIC CONSTITUENTS OF WASTE SLAG FROM REVERBERATORY REFINING OF COPPER PYRITIC TYPE ORES
Harold W. Wilson, El Paso, Tex., assignor of fifty percent to Wilson Laboratories, Inc., ten percent to Jack W. Flowers, ten percent to James H. Maxey, ten percent to David C. Casey, ten percent to Wesley D. Rogers, Jr., and ten percent to Vernon E. Thompson
Continuation of application Ser. No. 333,333, Dec. 26, 1963. This application Feb. 28, 1964, Ser. No. 348,063
8 Claims. (Cl. 75—108)

This is a continuation of pending application for U.S. patent, Serial No. 333,333, filed December 26, 1963, now abandoned.

This invention relates to the recovery of certain metallic and non-metallic constituents of waste slag produced as a result of smelting copper pyritic ores in a reverberatory copper refining furnace.

Due to the chemical composition of the ore and as a result of the way it has been refined, the slag resulting as a waste product from the reverberatory refining of copper pyritic ore contains appreciable amounts of iron as metal and as iron oxides and silicates as well as some metallic copper, zinc, and lead, all in combination with alkaline earth metals in a matrix of metallic and non-metallic silicates containing residual amounts of metallic sulfides.

A principal object of this invention is the provision of a process for the purpose of separating, isolating and recovering a major portion of the iron in said waste slag, and the recovery of the silica, calcium, copper, and zinc contained in the slag.

A more specific object of the invention is the treatment of such slag with aqueous acid solutions and oxidants for the purpose of selectively dissolving that portion of the slag consisting mainly of metallic iron, iron oxides, and metallic copper, lead and zinc and oxidizing them, especially the iron to ferric iron, while at the same time dissolving limited amounts of the silicate constituent of such slag. And, in particular, it is a special object of this process to react such slag with an acidic solution without causing a conversion of the silica dissolved by such acidic solutions into an insoluble silica gel (dehydrated) form until such time as it has been separated selectively from the other constituents found in the acid solubilized portion of treated slag.

Still another object of the invention is to provide a process wherein the acid-solubilized constituents of the slag are treated in such a manner that the iron (as trihydrated ferric oxide) and any acid-dissolved silica (as dihydrated silicon dioxide) are first separated from the other acid-solublized components, and then the iron (as tri-hydrated ferric oxide) and the acid-dissolved silica (as dihydrated silicon dioxide) are separated from each other by conversion of the ferric oxide into an acid-soluble salt and by conversion of the dihydrated silicon dioxide into an acid-insoluble compound of monohydrated silicon dioxide.

These and other objects are accomplished by the process shown schematically in the several sheets of drawings in the nature of flow sheets accompanying this application, which illustrate various alternatives in the process constituting this invention.

Briefly the process of this invention comprises:

(1) Treatment of the waste slag with aqueous solutions of approximately four normal strength mineral acid or mixtures of mineral acids possessing temperatures due to exothermic heats of dilution and of solution such that no external heat is required to effect maximum dissolution of the acid soluble metals and metallic oxides and metallic silicates contained in the waste slag so as to be able to obtain, by mechanical separation, an insoluble residue and a solution containing substantially all of the acid soluble iron, silicon, aluminum, calcium, lead, copper, and zinc values in this slag;

(2) Oxidation of this solution by use of an aqueous solution of nitrite salts, which in acid medium liberate nitrogen dioxide and other oxidizing nitrogen compounds which, in turn, oxidize the metallic ions of the solution (especially the ferrous ions) without causing conversion of soluble silica into insoluble silica gel.

(3) Forming hydrated oxides of iron, silica, and aluminum which are readily separated from the soluble compounds of calcium, lead, copper and zinc is accomplished by treatment of the acid soluble, oxidized, solution containing the soluble acids and acid soluble salts of iron, silica, aluminum, calcium, lead, copper and zinc with aqua ammonia solution to a pH of 7.3–7.5 and heating to boiling in order to achieve maximum oxidation at optimum pH, and eliminate excess oxides of nitrogen such as nitric oxide and nitrogen dioxide.

(4) Separating the hydrated oxides of iron and aluminum from the hydrated silica either by semi-drying and treating with sufficient 36 normal sulfuric acid to produce a 8–10 normal sulfuric acid system, or by, drying at 100°–105° C. and treating with either 8–10 normal sulfuric acid or 12 normal hydrochloric acid to dehydrate the dihydrated silica and convert it into monohydrated (insoluble) silica while forming soluble salts of iron and aluminum chloride (or sulfate depending upon the acid employed) which after dilution with 8–10 volumes of water and heating to boiling may be separated mechanically from the dehydrated silica.

(5) Washing of the silica to free it of any occluded metallic salts and acids.

(6) Treating the silica-free acid solution of iron and aluminum acid salts with aqua ammonia to reform the mixed iron aluminum trihydrated oxides, which after their mechanical separation from solution may be washed, dried, and calcined to produce ferric oxide with a slight aluminum oxide contamination, or the solution may be treated with boiling alkali to form trihydrated ferric oxide and a soluble aluminate which may be separated from one another and the iron trihydrate may be converted into ferric oxide by ignition, or the silica-free solution may be concentrated by heating to effect crystallization of reasonably pure, aluminum salt-free ferric chloride or ferric sulfate.

(7) Recovering the lead by treatment of the solution containing soluble ammonium salts of calcium, copper, zinc and lead, with sulfuric acid.

(8) Recovering the calcium by heating the resulting solution to boiling and while boiling adding sufficient aqua ammonia to adjust the pH to 7.0–7.1. On continued boiling insoluble calcium sulfate hexahydrate forms which is separated from the solution and is then converted into calcium sulfate dihydrate by drying at 100°–105° C. temperature; and (9) Recovering the copper and zinc (from the solution freed of lead and calcium) by electrolysis for recovery of metallic copper and zinc, or removal of these elements from solution may be accomplished by any of several known hydrometallurgical processes.

In an earlier United States Patent 2,927,851, I have described the treatment of waste slag derived from reverberatory refining of copper ores with concentrated sulfuric and/or phosphoric acids to cause the formation of acid insoluble silica gel containing entrapped unreacted slag and acid, and acid salts derived from the acid used in treatment of the slag. As described in that patent concentrated sulfuric and/or phosphoric acids react with such slag to cause the formation of acid insoluble silica gel, and I have found that certain concentrations of hydrochloric and nitric acids will likewise cause the formation of acid insoluble silica gel.

The invention hereinafter described is to treat such waste slag with certain aqueous solutions of mineral acids and additional chemical substances in such manner as to dissolve a maximum quantity of the slag treated, while at the same time preventing any said insoluble gel from forming, and hence is entirely different from the invention described in my earlier patent. It has been found that the solution obtained as a result of such treatment of the waste slag can be further treated chemically to make possible selective separation, isolation, and recovery of the following metals and compounds: acid salts of iron such as ferric chloride and ferric sulfate, silicon dioxide (as such, or as adsorptive silica gel), ferric oxide, calcium sulfate, lead sulfate, copper and zinc metal.

In this description, wherever reference is made to "slag" such reference is made to the waste product obtained from copper pyritic type ores which have been processed by the metallurgical process known as reverberatory refining. For use in the present process the slag is ground until a minimum of 90% passes a 200 mesh U.S. Standard Sieve. The following approximate composition is typical of such waste slag:

28%–32% iron expressed as Fe (and present as metal oxides, and silicate);
32–38% silicon dioxide (present as mixed silicates of iron, calcium, aluminum, and magnesium);
8%–10% expressed as CaO (present as basic silicate);
6%–8% expressed as $Al_2O_3$ (present as silicate);
2%–3% zinc;
less than 0.5% lead;
0.3–0.5% copper; and
less than 1% sulfur (as metal sulfides).

In order to obtain the maximum degree of acid solvation of the slag exposed to treatment and in order to prevent the soluble dihydrated silicon dioxide formed through acid hydrolysis of the acid soluble silicates of the slag from forming insoluble monohydrated silicon dioxide ($SiO_2 \cdot H_2O$) which during its formation creates a gel, it is necessary to maintain an acid concentration of the aqueous acid dissolving medium in the range of 3.0 to 4.5 normal and a minimum water content in the slag-acid-water system of not less than 65%. Use of acids more dilute than a 3.0 normal acid greatly reduces the solvation process, while acid solutions more concentrated than 4.5 normal cause gel formation within minutes of combining the acid solution with the slag. At no time should the temperature of the slag-aqueous acid system (nor the acid solubilized portion after its removal from the insolubles) exceed 175° F., nor should either of the noted systems be allowed to stand for prolonged time periods.

The lower the acid concentration, the higher the water concentration, or the lower the temperature, the longer the liquids can remain undisturbed without the occurrence of gelating. The liquid obtained with 4 normal hydrochloric acid containing 65% water and left standing undisturbed at 80° F. temperature forms a gel in about 8 hours. The same system gels to the same degree of rigidity in approximately 2 hours merely by raising its temperature to 178° F. The gel in both cases is irreversible and neither cooling nor dilution with water will effect re-solution of the gelled matter.

In accordance with the above, crushed waste slag is first treated with at least one acid selected from the group consisting of hydrochloric, nitric, nitrous, sulfuric, and mixtures of two or more of these acids. These acids may be used in conjunction with water soluble nitrite salts such as sodium nitrite or potassium nitrite. When nitric acid is used as the slag dissolving acid, if it is impure with nitrogen dioxide content then the separate addition of nitrite salt is not required. Approximately 0.5% of the total acid concentration of the acids used must be nitric acid in order to insure that the copper remain dissolved in the acid soluble solution during separation of the acid soluble solution from the acid insoluble residue. In the event that it is not desired to recover all of the copper and its loss as sulfide may be tolerated, nitric acid may be omitted from the acid initially used for dissolving the values to be recovered from the waste slag.

Use is made of the exothermic heats of dilution and solution incident to the addition of the acid or acids to the water in the preparation of the acid solution to be used as a solvent, by preparing the acid solution immediately prior to the addition of the acid solution to the dry slag. Use of the warm acid solutions improves the solubilizing effectiveness as compared with the effectiveness of atmospheric temperature acid solution solubilizing of atmospheric temperature slag. By preparing the acid solutions immediately prior to its addition to slag, both the cost of providing external heat required to achieve maximum solvation of the acid soluble components of the slag and the inherent danger of at least partial gelation occurring as a result of localizing overheating of the slag-acid mixture from use of external heating are eliminated.

The available exothermic heats of dilution and solution when various concentrated acids are added to water initially at a temperature of approximately 80° F. (atmospheric) in the preparation of 4 normal solutions are indicated by the temperature rises resulting from the acid addition of the named acid to water to produce a 4 N solution of the acid.

| Kind of conc. of acid used (at 80° F. temp.): | Temperature of 4 N acid, ° F. (From heat of dil. and sol'n.) |
| --- | --- |
| HCl—12 N | 102 |
| $HNO_3$—16 N | 108 |
| $H_2SO_4$—36 N | 142 |
| HCl—12 N and $H_2SO_4$—36 N | 100 |
| $HNO_3$—16 N and $H_2SO_4$—36 N | 101 |

Comparative examples of temperature rises resulting from heats of reaction when freshly prepared 4 normal acid solutions still warmed by heat of dilution and solution and 4 normal acid solutions which have been permitted to cool to atmospheric temperature (80° F.) are added to the same weight of approximately 80° F. temperature, dry, pulverized slag are shown below:

| Kind and temp. of acid (with heat of dil'n.): | Temp. from reaction, ° F. |
| --- | --- |
| HCl—4 at 102° F. | 157 |
| $HNO_3$—4 N at 108° F. | 161 |
| $H_2SO_4$—4 N at 135° F. | 173 |
| $H_2SO_4$—HCl—4 N at 100° F. | 136 |
| $H_2SO_4$—$HNO_3$—4 N at 101° F. | 138 |

| Kind and temp. of acid (cooled before use): | Temp. from reaction, ° F. |
| --- | --- |
| HCl—4 N at 80° F. | 132 |
| $HNO_3$—4 N at 80° F. | 138 |
| $H_2SO_4$—4 N at 80° F. | 142 |
| $H_2SO_3$—HCl—4 N at 78° F. | 116 |
| $H_2SO_4$—$HNO_3$—4 N at 78° F. | 118 |

The percent slag dissolved by the use of various acid solutions varies between 40% and 55% with the higher percentage resulting from use of hydrochloric and lower percentage resulting from use of mixed sulfuric and hydrochloric in a ratio of 1:1 by volume—or a normality ratio of 3:1. When the acid used for the initial treatment of the slag is sulfuric or sulfuric in combination with other acids most of the calcium dissolved recombines with the sulfate ion to form calcium sulfate hexahydrate which for the greater part remains with the acid insoluble residue after separation from the acid soluble liquid portion. This calcium sulfate may be recovered by leaching the residue with hot 5% ammonium chloride solution in which the calcium salt is soluble. After separation the calcium salt solution can be treated by various known methods for recovery of calcium sulfate dihydrate or hemihydrate.

After the initial treatment of the slag, in which the acid soluble portion of the waste slag is dissolved, the acid insoluble residue is separated from the acid soluble portion by vacuum filtration or pressure filtration or by centrifuging. Any residual acid soluble material is removed from the solid residue by washing the residue with water. The washings are combined with the acid soluble solution.

In this process, during or after dissolving the acid soluble portion of the slag, in order to effect separation and recovery of the iron, it is imperative that such iron be oxidized to its highest (ferric) valence state since ferrous oxide hydrate cannot be removed effectively from the acid solution by presently known methods, while the ferric oxide hydrate can be completely removed by simple physical separation techniques. The oxidation must be of such a nature that the soluble dihydrated silica of the solution is not converted into its insoluble gel form of monohydrate before it has been separated from the acid insoluble components of the slag.

Oxidation of the iron of the system without dehydration of the dihydrated silica may be achieved in this process during the solvation action of certain acid combinations or by treatment of the acid solubilized fraction from use of other acid treatments after its separation from the acid insoluble residue. Examples of controlled acid solvation and acid solvation in conjunction with controlled oxidation where the solubilized iron and silica along with other solubilized constituents of the slag are kept in solution for their selective separation, isolation, and recovery are as follows:

Example 1

One hundred parts by weight (grams) of crushed slag are stirred into 300 parts by volume (ml.) of a freshly prepared 4 normal solution of hydrochloric acid containing approximately one part by volume of nitrogen dioxide containing nitric acid. The acid solution was added to the dry, pulverized slag in a suitable container all at one time while thoroughly agitating the ingredients by mild stirring for a time period of 8–10 minutes. As the length of mixing time is shortened below about 7 minutes the percentage of slag dissolved is diminished. The addition of the acid solution causes a reaction in which hydrogen gas is liberated along with some hydrogen sulfide gas and is mildly violent in that the evolution of gas causes a great volume increase along with rapid temperature rise, which reaches its maximum in approximately 2 minutes. Mixing time in excess of 7–8 minutes does not appear to result in further solvation but appears to favor gel formation. Hence, separation of the liquid and solid phase from each other as promptly as possible after sufficient mixing is important particularly when the acid concentration, water content of the system or temperature are borderline, in which cases the composition could gel before the liquid and solid are separated. If all of the noted factors are within specified limits, mixing time may be extended to at least one hour without gel formation—but since this does not appear to result in increased solvation the additional mixing time is not warranted. In this example the temperature rise from heat of reaction reached 157° F. in 2 minutes and the reacted mixture had a temperature of 147° F. at the end of 8 minutes.

One equation illustrating a possible reaction between the HCl and the iron ingredients of the slag—Fe, FeO, and $Fe_3O_4$ in this example is $$Fe + FeO + 2Fe_3O_4 + 22HCl$$
$$= 6FeCl_3 + 2FeCl_2 + 9H_2O + 2H_2$$

Example 2

Another hundred parts by weight (grams) of the crushed slag were mixed with 300 parts by volume (ml.) of a freshly prepared 4 normal solution of nitric acid containing nitrogen dioxide as an impurity. Other than the use of the 4 normal nitric acid solution the process was identical to the one described in Example 1. The following equations describe the reactions taking place between the iron ingredients of the slag and the nitric acid:

(1) $Fe + FeO + Fe_3O_4 + 12HNO_3$
$= 3Fe(NO_3)_2 + 2Fe(NO_3)_3 + 5H_2O + H_2$ (2) $Fe(NO_3)_2 + NO_2 + H_2O = Fe(NO_3)_3 + H_2$

Example 3

Another one hundred parts by weight (grams) of crushed slag were treated with 280 parts by volume (ml.) of a freshly prepared 4 normal hydrochloric-nitric acid solution in the same manner as in Example 1 above where 4 normal hydrochloric acid was employed. In order to insure conversion of intermediately formed ferric oxide and hydrated ferric oxide into ferric chloride salts, the hydrochloric acid concentration in the hydrochloric-nitric acid solution used exceeded the nitric acid concentration by at least 10%. When a 4 normal acid solution prepared by combining 8 ml. of 16 N nitric acid, 12 ml. of 12 N hydrochloric acid, and 38 ml. of water was used it provided insufficient available chloride ions to react with all ferric ions since a great amount of the chloride ions are consumed from reaction with calcium ions to form calcium chloride and the undissolved, insoluble portions of ferric oxide and its hydrate remained with the acid insoluble residue, whereas a 4 normal solution prepared by mixing 8 ml. of 16 normal nitric acid, 16 ml. of 12 N hydrochloric acid, and 56 ml. of water converted all of the ferric oxide and hydrate into ferric chloride.

Equations demonstrating these reactions are shown below:

(1)
$3Fe + 3FeO + 4Fe_3O_4 + 13HCl + HNO_3$
$= 3FeCl_3 + 4Fe(NO_3)_3 + 3Fe_2O_3 + 3Fe(OH)_3$
$+ 2FeCl_2 + 5H_2O + 2NO + 4H_2$ (2) $Fe_2O_3 + Fe(OH)_3 + 9HCl = 3FeCl_3 + 6H_2O$ (3) $3FeCl_2 + 3HCl + HNO_3 = 3FeCl_3 + NO + 2H_2O$

Example 4

Another one hundred parts by weight (grams) of crushed slag were treated with 275 parts by volume (ml.) of a freshly prepared $H_2SO_4$ solution of 4 normal concentration which has been cooled before use to a temperature not in excess of 135° F. there having been added approximately one ml. of nitric acid containing nitrogen dioxide to the $H_2SO_4$ solution before its addition to the dry slag. Equations showing the chemical reaction with this solvent are:

(1) $Fe + FeO + Fe_3O_4 + 6H_2SO_4$
$= 3FeSO_4 + Fe_2(SO_4)_3 + 5H_2O + H_2$ (2) $2FeSO_4 + NO_2 + H_2SO_4 = Fe_2(SO_4)_3 + H_2O + NO$

Example 5

An additional 100 grams of slag were treated with 300 ml. of a freshly prepared solution of 4 normal mixed acid in the proportion by volume of one part of 36 N sulfuric acid to 4 parts of 12 N hydrochloric acid containing approximately 0.5% of nitrogen dioxide-containing nitric acid.

Example 6

An additional 100 grams of slag was treated with 300 ml. of a freshly prepared solution of 4 normal mixed acid consisting of one part of 36 N $H_2SO_4$ to 3 parts of 16 N $HNO_3$ by volume.

In any of the foregoing examples, at the end of the 8–10 minute mixing period of the dry slag with the aqueous acid solution selected, the acid soluble liquid portion is separated from the acid insoluble unreacted solid portion by use of pressure or vacuum filtration or centrifuging or any other suitable physical separation process. The insoluble residue is washed with water to free it of any occluded acid soluble liquid. The washings are added to the previously separated acid soluble liquid portion. The acid insoluble solid residue freed from any acid soluble material by the water washing is discarded except when the solvation acid used was sulfuric. In this case the residue is treated further as noted below for the recovery of calcium, zinc, and lead, if desired.

The acid soluble solution recovered by separation from the acid insoluble residue, if it has not yet been oxidized at this stage, may be treated with any of the following oxidants to convert ferrous iron to ferric iron: hydrogen peroxide, sodium or potassium peroxides, hypochlorous acid, sodium or potassium hypochlorite, sodium or potassium chlorate, perchloric acid, and sodium and potassium perchlorates, or $NO_2$ and $N_2O_3$ derived from use of nitrite salts with acid. Examples of such oxidation of ferrous iron when sulfuric acid was employed as the slag solvation agent to produce ferrous sulfate are shown below:

$$2FeSO_4+H_2O_2+H_2SO_4=Fe_2(SO_4)_3+2H_2$$
$$2FeSO_4+Na_2O_2+H_2SO_4=Fe_2(SO_4)_3+2NaOH$$
$$6FeSO_4+3HClO+3H_2SO_4=3Fe_2(SO_4)_3+3HCl+3H_2O$$
$$6FeSO_4+KClO_3+3H_2SO_4=3Fe_2(SO_4)_3+KCl+3H_2O$$
$$8FeSO_4+NaClO_4+4H_2SO_4=4Fe_2(SO_4)_3+NaCl+4H_2O$$

Since, as indicated below, aqua ammonia is introduced into the acidic medium after oxidation of ferrous iron to the ferric state in order to keep copper and zinc ions in solution as soluble complexes, it is preferable to employ oxidants such as hydrogen peroxide, hypochlorous acid, and perchloric acid which will leave acid residues in the system rather than leaving the system alkaline with basic hydroxides. However, judicious use of alkaline oxidants such as sodium peroxide and acidic oxidants such as hydrogen peroxide in combination will result in a final slightly acidic system requiring minimum amounts of aqua ammonia to create a pH of between pH 7.3 and 7.5 in which completed oxidation has taken place to form the mixed hydrated oxides of iron, silica, and aluminum as insolubles and the copper and zinc in soluble form to allow separation of the one group from the other.

If the separated acid soluble fraction was not treated with any of the above named oxidants and except when nitric acid containing nitrogen dioxide was used in the slag dissolving process, the separated acid soluble portion is treated with a water solution of a water soluble nitrite salt such as sodium or potassium nitrite or the like.

Since in using acids other than nitric acid containing nitrogen dioxide as the solvation acids the dissolved iron in the acid soluble portion exists as ferrous iron predominantly. In order to achieve optimum separation of the iron from the acid soluble fraction it is necessary to convert the iron from the ferrous state to the ferric state. This conversion is accomplished through the reaction of the nitrite salt introduced with the acid to cause oxidation of the iron without causing dehydration of the soluble dihydrate or silica. Equations illustrating these reactions are shown below:

(1) $\quad NaNO_2+HCl=NaCl+HNO_2$
and $\quad 2NaNO_2+H_2SO_4=Na_2SO_4+HNO_2$
(2) $\quad 2HNO_2=H_2O+N_2O_3$
and $\quad N_2O_3=NO+NO_2=2NO+(O)$
(3) $FeCl_2+NaNO_2+2HCl=FeCl_3+NaCl+H_2O+NO$
and 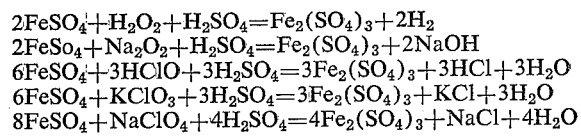
and $\quad Fe(NO_3)_2+NO_2+H_2O=Fe(NO_3)_3+H_2$ It will be noted that in all of the examples of this process that oxidation of the iron is brought about by the combined effect of the nitrate and/or nitrite radicals in the presence of free hydrogen ions of the acid present whether it be nitric acid, hydrochloric acid, sulfuric acid, or mixtures of such acids where nitrogen dioxide as such activity brings about the actual oxidation of the system.

The nitrite salt solution may be added either during the acid solvation treatment or to the acid soluble solution after its separation from the insoluble residue. For each 100 parts by weight of slag approximately 8 parts by weight of the nitrite salt is required. Use of smaller amounts of nitrite salt results in incomplete oxidation, while more than this amount produces no additional benefits. The equations above indicate that definite amounts of free acid favor maximum formation of maximum amounts of the desired nitrogen dioxide for optimum oxidation conditions. A three to five minute period of contact of the nitrate salt with the acid medinum is sufficient to achieve complete oxidation of all iron in the system.

The acidic acid soluble, oxidized fraction now having its iron content all in the ferric state is neutralized by adding an aqueous ammonia solution (15 normal) until the pH of the solution is between pH 7.2 and pH 7.5. Weaker solutions of the aqueous ammonia may be used with no different effect other than increasing the volume of the system. Use of aqua ammonia to produce pH values above 7.5 contribute no value, while at the same time such use would cause use of unnecessary amounts of additional chemicals in later phases of the process. pH values between 7.0 and 7.2 or lower (into the acid range) are totally unsatisfactory in that there would be insufficient ammonium ion for formation of the trihydrated ferric oxide and formation of the ammonium complexes of copper and zinc. The use of alkali hydroxides instead of aqua ammonia to accomplish the pH change results in the hydrated ferric oxide being contaminated with insoluble copper and zinc compounds. The aqua ammonia accomplishes conversion of the iron and aluminum present in solution into their respective trihydrated oxides and conversion of the dihydrated silica into silica monohydrate. These coprecipitated oxides of iron, aluminum, and silica are easily separated from the liquid by vacuum filtration or pressure filtration or by centrifuging and can be washed free of the major portion of any occluded calcium, lead, copper, and zinc soluble salts by use of very dilute aqua ammonia water (0.1% $NH_3$ solution) without loss through iron sol formation. The solution after addition of aqua ammonia solution to the specified pH is heated to boiling to insure total oxidation of the iron (which is optimum at pH of approximately 7.0) and boiling the solution for one to two minutes assures conversion of any colloidal sol of the hydrated iron oxide to a gel, while at the same time eliminating all unused nitrogen dioxide (note Equations 2, 3 and 4 following).

The following equations illustrate the mechanism of formation of the trihydrates of iron and aluminum and the elimination of the unused nitrogen dioxide from the system:

(1)
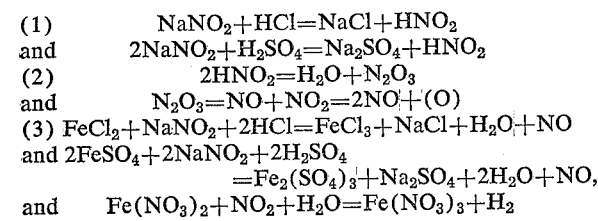

(2) $\quad 2NaNO_2+2H^+=2Na^++H_2O+NO$
(3) 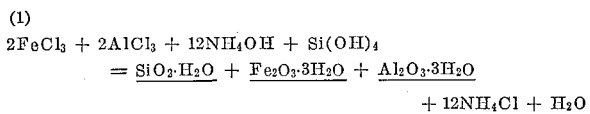
(4) 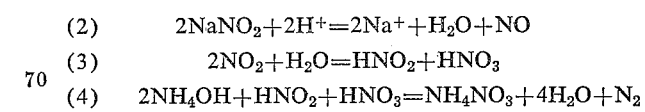

Due to the physical nature of the coprecipitate of iron-aluminum-silica hydrated oxides it can be dissolved in acid and reprecipitated as often as desired provided it is not allowed to lose its water of hydration. Selective drying at varied temperatures produced adsorbents having capacities of adsorption of liquids and gases. Drying and calcination results in products capable of being used as combination color and extender, surface coating pigments. If it is desired, after removal of the major portion of free water (80%–90%) by drying, the coprecipitate can be treated with either 12 normal hydrochloric or 36 normal sulfuric acid which will dissolve the iron and aluminum while dehydrating the hydrated silica into a dehydrated silicon dioxide. After water dilution of the acid treated semi-dried or dried coprecipitate with 8 to 10 volumes of water the resulting mixture can be filtered or centrifuged to separate the dehydrated silica from the soluble iron and aluminum acid salts. Washing of the separated silica with hot water frees it of any soluble contaminants and produces a product which can be dried and used as such or which may be processed by known methods to activate for use as an adsorbent material. Treatment of the acid solution of iron and aluminum with aqua ammonia solution to a pH of 3.2 will cause precipitation of the iron as trihydrated oxide. The precipitate (by use of aqua ammonia) of the iron hydrated oxide may be dried and calcined to a product consisting predominantly of ferric oxide and may be used as such. If it is desired, instead of converting the iron into the trihydrated oxide form by neutralizating to pH 3.2 with aqua ammonia to effect precipitation of the hydrated oxide, the solution of acid salts may be processed by selective crystallization to produce ferric chloride or ferric sulfate depending upon the acid solution used in dissolution of the ferric-aluminum hydrates from the silica.

The ammoniacal solution resulting from removal of the hydrates of iron, aluminum, and silica and containing soluble salts of lead, calcium, copper, and zinc (unless sulfuric acid was employed as the initial acid solvation agent which would have caused formation of lead sulfate and calcium sulfate insoluble in the medium and thus not present in the solution) is heated to boiling and acidified with sufficient sulfuric acid to cause formation of lead sulfate and calcium sulfate. The lead sulfate formed is insoluble in the sulfuric acid and may be removed as a solid by filtration or centrifuging. The lead-free acidic solution is neutralized to pH 7.0 to 7.1 with aqua ammonia and heated to boiling to cause the formation of insoluble calcium sulfate hexahydrate which is removed by filtration or centrifuging. The calcium sulfate is dried at 100°–105° F. temperature after which it is washed with alcohol to remove occluded ammonium salts and then washed with water, yielding relatively pure calcium sulfate dihydrate. Removal of the lead and calcium leaves a slightly ammoniacal solution containing soluble compounds of copper and zinc. Recovery of these elements in metallic form can be accomplished by known methods of electrolytic deposition. Their isolation and recovery may also be accomplished by conversion into sulfide form, followed by acid dissolution and metallic displacement methods.

When sulfuric acid is employed as the solvation agent, calcium, zinc, and lead will be found with the acid insoluble residue as sulfates. After washing this residue to free it of all acid and acid solubles, it is mixed with a few volumes of hot water, made slightly alkaline with gas ammonia (to insure no solvation of silica), and treated with sufficient ammonium salt of sulfate, chloride, or nitrate to effect solvation of the calcium, zinc and lead sulfates. The mixture is digested while heating to cause the soluble complexes of calcium, zinc, and lead ammonium sulfates to form. Separation of the soluble complexes by filtration or centrifuging followed by washing the insoluble residue with water containing 2%–3% ammonium salt results in a solution which is treated as follows for recovery of its calcium, zinc, and lead compounds. The solution is heated to boiling and boiled to the absence of free ammonia (no odor) after which sufficient aqueous alkali (NaOH or KOH) solution is added to cause the formation of insoluble zinc and lead hydroxides as shown below:

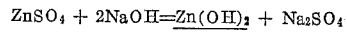

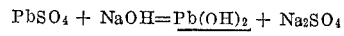

Excess alkali or prolonged boiling are to be avoided to minimize the conversion of zinc and lead hydroxides into their soluble forms of zincate and plumbate as shown below:

$$Zn(OH)_2 + 2NaOH = Na_2ZnO_2 + 2H_2O$$

$$Pb(OH)_2 + 2NaOH = Na_2PbO_2 + 2H_2O$$

The insoluble zinc and lead hydroxides are separated from the solution by filtration or centrifuging and after washing are mixed with a few volumes of water and mildly acidified with sulfuric acid, which on boiling causes the formation of insoluble lead sulfate and a solution of zinc sulfate. The lead sulfate is separated by filtration or centrifuging from the zinc sulfate solution which is then made ammoniacal with aqua ammonia to permit electrolytic recovery of metallic zinc.

The solution remaining after separation of the zinc and lead hydroxides is boiled until free of ammonia as noted by no liberation of ammonia when treated with small additional amounts of alkali hydroxide. During the boiling of the solution to an absence of ammonia, hydrated calcium sulfate is formed, which may be removed by filtration or centrifuging. Complete precipitation and total conversion of all calcium in the system may be obtained by cooling the solution freed of ammonia and diluting the solution with alcohol. A small loss of calcium is encountered if alcohol is not introduced. The separated hydrated calcium sulfate is dried at 100°–105° C. temperature, and after drying is washed with water-alcohol mixture first and then by water to remove soluble occluded sodium salts present. The calcium sulfate dihydrate is then dried for use.

The separated mixture of lead hydroxide and zinc hydroxide is washed free of any occluded material with water and then added to two or three volumes of water. Sufficient sulfuric acid is added to dissolve the hydroxides and the solution heated to boiling during which time lead sulfate (insoluble) is formed in a solution of zinc sulfate. The lead sulfate is separated by filtration or centrifuging and after washing with water free of any zinc and dried is ready for use. The solution of zinc sulfate is treated with aqua ammonia to slight excess and the ammoniacal solution electrolyzed for recovery of metallic zinc.

The acidic solution of iron, silica, aluminum, and copper containing only trace amounts of calcium and zinc recovered from the solvation of the slag with sulfuric acid is treated with aqua ammonia solution (15 normal preferably) until the solution's pH is slightly over 7 after which sufficient oxidant from the group comprised of peroxides, chlorites, chlorates, or perchlorates is added to convert all ferrous iron into ferric iron. If acid residue oxidants such as hydogen peroxide are used for oxidation the addition of additional aqua ammonia is made to maintain a pH of the solution between pH 2.5–3.5, which range is optimum for quick, complete conversion of ferrous iron to ferric iron. When the solid matter formed in the solution retains a bright, red-orange color upon addition of additional aqua ammonia, complete oxidation has been accomplished. If the solution and precipitate turn black, blue, or dark green at the point of addition of the added aqua ammonia this is evidence of incomplete oxidation showing the need for addition of additional oxidant. After oxidation is completed additional aqua ammonia is added until the pH is between pH 7.3 to 7.5 after which the liquid is heated to boiling and boiled approximately 2 minutes to effect coagulation of the hydrated oxides which is noted by the color of the solid matter in the solution changing from red-orange to "Indian red"—or deep reddish-brown in color. Separation of the hydrated oxides from the solution and the treatment for recovery of copper from the solution and separation, isolation, and recovery of ferric iron acid salts or oxide, the monohydrated silica, or combinations of mixed dehydrated oxides of iron, silica, and aluminum is performed in the same manner as has been described when acids other than sulfuric were used in the initial solvation of the slag.

What is claimed as new is as follows:

1. A wet process for the separation, isolation and recovery of the acid soluble metallic and non-metallic values in waste slag resulting from the reverbratory refining of copper pyritic type ores which comprises:
   crushing the slag;
   adding a warm solution of at least one mineral acid to said crushed slag, said solution having a normality of 4 at the time it is added to the slag;
   mixing the slag and acid for not less than 8 minutes under conditions such that the two are not permitted to reach a temperature of 175° F., whereby the formation of silica gel is avoided;
   separating the resulting solution from the solid insoluble residue; and
   recovering the soluble iron, lead, copper, calcium, silicon, zinc and aluminum values originally present in said slag from said solution.

2. The process of claim 1 wherein the mineral acid is selected from the group consisting of hydrochloric, nitric, and sulfuric and mixtures of said acids with one another and with nitrous acid.

3. The process of claim 1 wherein the recovery of the values in said solution after the solution resulting from treatment of the crushed slag with said mineral acid has been separated from the insoluble residue, includes: addition of a sufficient amount of a nitrite salt to the solution to oxidize all of the iron present in the solution to ferric iron; addition of a sufficient amount of ammonia to raise the pH to between 7.2 and 7.5 and boiling the solutions to precipitate hydrated oxides of iron, silicon and aluminum.

4. The process of claim 1 wherein mineral acid is a mixture of hydrochloric and nitric acids.

5. A wet process for the separation, isolation and recovery of the acid soluble metallic and non-metallic values in waste slag resulting from the reverberatory refining of copper pyritic type ores which comprises:
   crushing the slag;
   preparing a 4 normal solution of at least one mineral acid selected from the group consisting of HCl, $HNO_3$, $H_2SO_4$ by dilution of a stronger solution of said acid;
   adding the warm solution of said mineral acid to said crushed slag, said solution having a normality of 4 at the time it is added to the slag and retaining at least a substantial portion of the heat of dilution and solution incident to the preparation of said acid;
   mixing the slag and warm acid for not less than 8 minutes under conditions such that the two are not permitted to reach a temperature of 175° F., whereby the formation of silica gel is avoided;
   separating the resulting solution from the solid insoluble residue; and
   recovering the soluble iron, lead, copper, calcium, silicon, zinc and aluminum values originally present in said slag from said solution.

6. A wet process for the separation, isolation and recovery of the acid soluble metallic and non-metallic values in waste slag resulting from the reverberatory refining of copper pyritic type ores which comprises:
   crushing the slag;
   adding a warm solution of sulfuric acid to said crushed slag, said solution having a normality of 4 at the time it is added to the slag;
   mixing the slag and acid for not less than 8 minutes under conditions such that the two are not permitted to reach a temperature of 175° F., whereby the formation of silica gel is avoided;
   separating the resulting solution from the solid insoluble residue; and
   recovering the soluble iron, copper, silicon, and aluminum values originally present in said slag from said solution and the lead, calcium and zinc values in said slag from said insoluble residue.

7. A wet process for the separation, isolation and recovery of the acid soluble metallic and non-metallic values in waste slag resulting from the reverberatory refining of copper pyritic type ores which comprises:
   crushing the slag;
   adding a warm solution of at least one mineral acid to said crushed slag, said solution having a normality of 4 at the time it is added to the slag;
   mixing the slag and acid for not less than 8 minutes under conditions such that the two are not permitted to reach a temperature of 175° F., whereby the formation of silica gel is avoided;
   separating the resulting solution from the solid insoluble residue;
   adding a nitrite salt to the separated solution to oxidize all of the iron therein to ferric iron;
   adding ammonia to the resulting solution to produce a pH between 7.2 and 7.5;
   boiling the solution thereby precipitating the iron, silicon and aluminum therein as a mixture of hydrated oxides;
   separating the precipitate from the solution;
   acidifying the precipitate to dissolve the iron and aluminum therein;
   removing some of the water present by heating the acidified solution;
   and separating the resulting silica gel from the remaining liquid.

8. A wet process for the separation, isolation and recovery of the acid soluble metallic and non-metallic values in waste slag resulting from the reverberatory refining of copper pyritic type ores which comprises:
   crushing the slag;
   adding a warm solution of at least one mineral acid to said crushed slag, said solution having a normality of 4 at the time it is added to the slag;
   mixing the slag and acid for not less than 8 minutes under conditions such that the two are not permitted to reach a temperature of 175° F., whereby the formation of silica gel is avoided;
   separating the resulting solution from the solid insoluble residue; and
   separately recovering the iron, lead, copper, calcium, silicon, zinc and aluminum values in said slag from said solution and from said insoluble residue.

No references cited.

DAVID L. RECK, *Primary Examiner.*

N. F. MARKVA, *Examiner.*